(12) United States Patent
Raimarckers

(10) Patent No.: US 10,676,215 B2
(45) Date of Patent: Jun. 9, 2020

(54) TURBOMACHINE COWLING WITH SCREEN

(71) Applicant: SAFRAN AERO BOOSTERS SA, Herstal (BE)

(72) Inventor: Nicolas Raimarckers, Tourinne (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 230 days.

(21) Appl. No.: 15/928,810

(22) Filed: Mar. 22, 2018

(65) Prior Publication Data

US 2018/0273210 A1    Sep. 27, 2018

(30) Foreign Application Priority Data

Mar. 22, 2017   (BE) .................................. 2017/5188

(51) Int. Cl.
*B64F 5/60*        (2017.01)
*B64D 29/00*       (2006.01)
(Continued)

(52) U.S. Cl.
CPC ............... *B64F 5/60* (2017.01); *B64D 29/00* (2013.01); *B64D 29/08* (2013.01); *B64D 45/00* (2013.01); *B64F 5/40* (2017.01); *F01D 21/003* (2013.01); *F01M 11/10* (2013.01); *F01M 11/12* (2013.01); *F16N 19/006* (2013.01); *G07C 5/006* (2013.01); *G07C 5/0825* (2013.01);
(Continued)

(58) Field of Classification Search
CPC ... B64F 5/60; B64F 5/40; B64D 29/00; B64D 29/08; B64D 45/00; B64D 2045/0085; F01D 21/003; F01D 25/18; F01M 11/10; F01M 11/12; F16N 19/006; F16N 2210/02; G07C 5/006; G07C 5/0825; F05D 2260/80; F05D 2270/80
USPC ........................................................ 701/29.4
See application file for complete search history.

(56) References Cited

U.S. PATENT DOCUMENTS 3,736,431 A *  5/1973  Childs ........................ G01J 1/10
                                                        250/205
4,758,190 A *  7/1988  Van Vuren ............ F02B 61/045
                                                        440/77
(Continued)

FOREIGN PATENT DOCUMENTS

CA        2953858 A1 *  7/2017  ............. F01D 25/18
CN     107054691 A  *  8/2017  ............ F01D 21/003
(Continued)

OTHER PUBLICATIONS

Search Report dated Nov. 13, 2017 for BE 201705188.

*Primary Examiner* — Behrang Badii
*Assistant Examiner* — Jalal C Coduroglu
(74) *Attorney, Agent, or Firm* — James E. Walton

(57) ABSTRACT

A jet engine includes an external cowling, a member such as an oil reservoir, and a monitoring system for the member that is able to determine information relating to the member. The external cowling includes a visualization screen that is able to communicate with the monitoring system or directly with the member, so as to display the information specific to the member. When installed in the nacelle of the jet engine, this cowling becomes a smart cowling. The system also includes a method for inspecting a member of an aircraft jet engine and a corresponding computer program.

20 Claims, 3 Drawing Sheets

(51) Int. Cl.
*B64F 5/40* (2017.01)
*B64D 45/00* (2006.01)
*F01M 11/12* (2006.01)
*F16N 19/00* (2006.01)
*F01D 21/00* (2006.01)
*B64D 29/08* (2006.01)
*F01M 11/10* (2006.01)
*G07C 5/00* (2006.01)
*G07C 5/08* (2006.01)
*F01D 25/18* (2006.01)

(52) U.S. Cl.
CPC ...... *B64D 2045/0085* (2013.01); *F01D 25/18* (2013.01); *F05D 2260/80* (2013.01); *F05D 2270/80* (2013.01); *F16N 2210/02* (2013.01)

(56) References Cited

U.S. PATENT DOCUMENTS

| | | | | |
|---|---|---|---|---|
| 6,691,023 | B2 * | 2/2004 | Fujino | G01M 15/04 701/114 |
| 8,820,344 | B2 * | 9/2014 | Vauchel | B64D 29/06 137/15.1 |
| 9,896,972 | B2 * | 2/2018 | Hoes | F01D 25/246 |
| 9,903,228 | B2 * | 2/2018 | Durie | F02C 7/04 |
| 10,001,024 | B2 * | 6/2018 | Schuster | F01D 11/122 |
| 10,049,111 | B2 * | 8/2018 | Soldani | G06F 3/147 |
| 10,067,044 | B2 * | 9/2018 | Taba | B64C 1/064 |
| 10,077,678 | B2 * | 9/2018 | Hannecart | B29C 70/766 |
| 10,245,766 | B2 * | 4/2019 | Hannecart | B29C 45/14311 |
| 10,359,054 | B2 * | 7/2019 | Hiernaux | F01D 11/04 |
| 10,393,314 | B2 * | 8/2019 | Raimarckers | F16N 19/003 |
| 10,428,833 | B2 * | 10/2019 | Cortequisse | F04D 29/083 |
| 10,448,833 | B2 * | 10/2019 | Dastgheib | A61B 5/14865 |
| 2002/0110263 | A1 * | 8/2002 | Thompson | G07C 9/37 382/115 |
| 2005/0017876 | A1 * | 1/2005 | Ziarno | B64D 29/00 340/945 |
| 2007/0039185 | A1 * | 2/2007 | Chen | C23F 1/14 29/898.02 |
| 2011/0284095 | A1 * | 11/2011 | Vauchel | B64D 29/06 137/15.1 |
| 2015/0176527 | A1 * | 6/2015 | Todorovic | F02K 1/72 60/226.2 |
| 2017/0233076 | A1 * | 8/2017 | Grossman | B64D 37/04 244/137.4 |

FOREIGN PATENT DOCUMENTS

| | | | | |
|---|---|---|---|---|
| EP | 1099629 | A1 * | 5/2001 | ............. E05B 41/00 |
| EP | 2378490 | A1 * | 10/2011 | ........... G07C 5/0816 |
| EP | 2378490 | A1 | 10/2011 | |
| FR | 2919532 | A1 * | 2/2009 | ............. F01N 13/10 |
| FR | 2932160 | A1 * | 12/2009 | ............. A23P 30/40 |
| FR | 2971595 | A1 * | 8/2012 | ................ B64F 5/60 |
| FR | 2971595 | A1 | 8/2017 | |
| WO | WO-2010001009 | A2 * | 1/2010 | ................ B64F 5/60 |

\* cited by examiner

TURBOMACHINE COWLING WITH SCREEN

This application claims priority under 35 U.S.C. § 119 to Belgium Patent Application No. 2017/5188, filed 22 Mar. 2017, titled "Turbomachine Cowling with Screen," which is incorporated herein by reference for all purposes.

BACKGROUND

1. Field of the Application

The present application relates to the visual inspection of a jet engine. More precisely, the present application relates to a jet engine equipped with a cowling, in particular a jet engine of an aeroplane or a turboprop of an aircraft.

2. Description of Related Art

Monitoring and inspection of a jet engine make it possible to ensure proper operation thereof, and to reveal breakdowns. This monitoring also makes it possible to predict probabilities of risks of breakdowns by monitoring certain internal parameters of the jet engine. For example, in flight, data processing makes it possible to analyse and identify anomalies that could represent a present or future danger.

The document FR 2971595 A1 discloses a method for monitoring a jet engine. The method comprises the following steps: gathering, over time, measurements of variables relating to a current engine, comprising a first set of measurements of internal variables and a second set of measurements of external variables; standardizing the measurements relating to internal variables taking into account the measurements relating to the external variables so as to form, at each acquisition, an input point representing a state of said current engine in a multi-dimensional space; projecting each input point of the multi-dimensional space onto an image point of a previously constructed map, so as to form, on said map, a sequence of image points that reflects the distribution of the input points in the multi-dimensional space, said image points forming a current trajectory (S1-S3) which is representative of an evolution of the states of said current engine; comparing a segment of the end of said current trajectory with segments of aircraft engine trajectories previously saved in a database in order to find similar trajectories; and analysing the statistical evolution of said end of the current trajectory as a function of said similar trajectories in order to anticipate maintenance operations on said current engine. However, the precision of this method remains limited, as is the security that it provides.

Although great strides have been made in the area of visual inspection of jet engines, many shortcomings remain.

DETAILED DESCRIPTION OF THE PREFERRED EMBODIMENT

Figure 1:
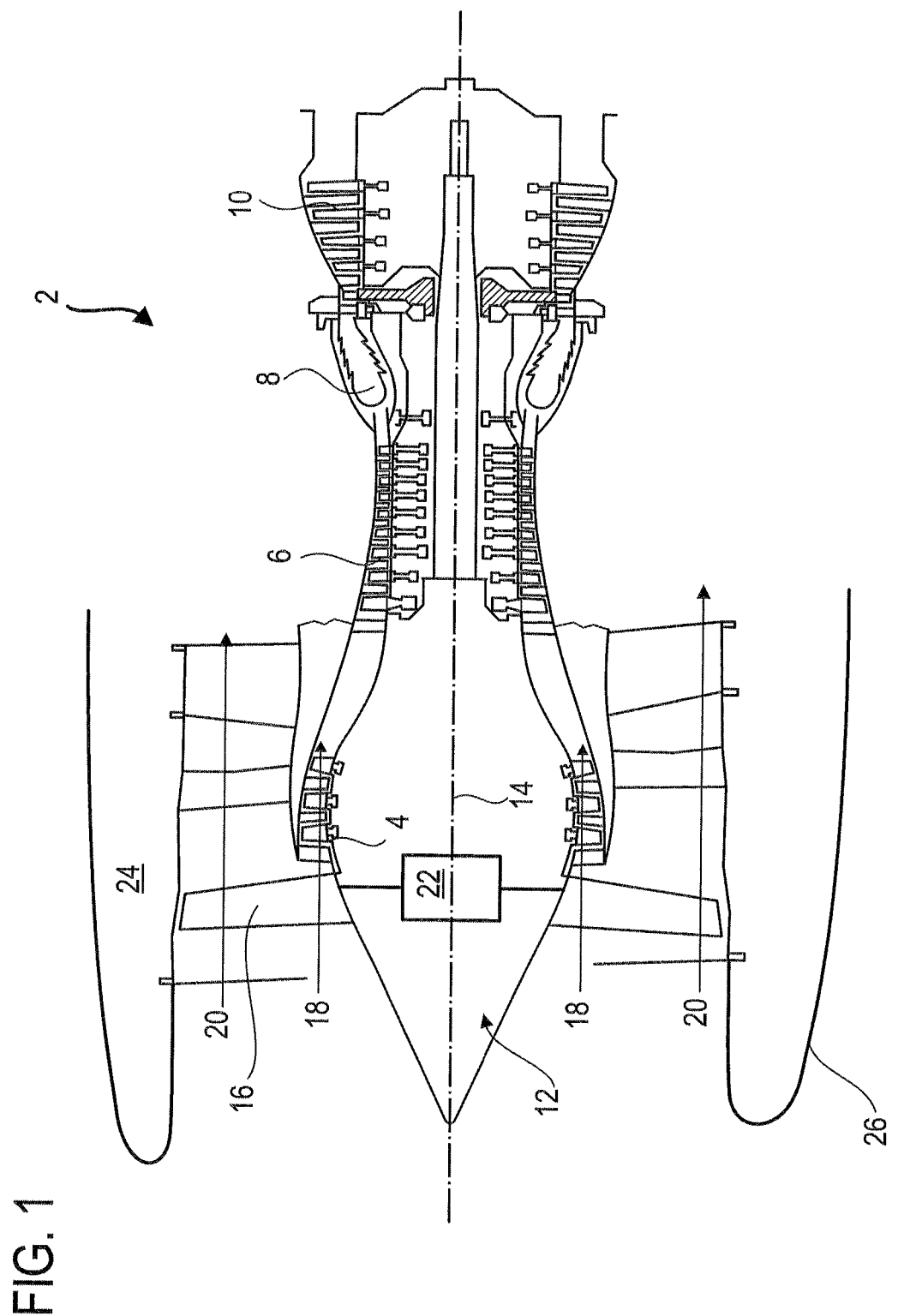
FIG. 1 shows a section through a jet engine according to the present application.

The present application aims to solve at least one of the problems presented by the prior art. More precisely, the present application has the object of improving the security of the monitoring of a jet engine. The present application also has the object of proposing a solution that is rapid, durable, lightweight, economical, reliable, easy to produce, that improves efficiency and limits the flow of information.

The present application relates to a jet engine comprising an external cowling, a member, a monitoring system for the member that is able to provide information relating to the member; noteworthy in that the external cowling comprises a visualization screen that is able to communicate with the monitoring system or directly with the member so as to display the information relating to said member.

According to advantageous embodiments of the present application, the jet engine may comprise one or more of the following features, taken alone or in any possible technical combination:

- the external cowling comprises a wall with a recess in which the screen is arranged.
- the cowling is a cowling that can be moved so as to articulate the screen with respect to the member.
- the jet engine comprises a nacelle, the cowling being a cowling of a nacelle.
- the member comprises a sensor that is able to measure data which is displayed on the visualization screen.
- the sensor is a level sensor, or a temperature sensor, or a pressure sensor, the output of which is displayed on the visualization screen.
- the jet engine comprises an electrical supply and/or a computer memory.
- the member comprises a radio transmitter configured to communicate with the visualization screen in order to communicate the information relating to the member.
- the member is an oil reservoir having a fully opaque outer surface.
- the visualization screen comprises means for processing data of the information relating to the member.
- the jet engine, in particular the visualization screen, comprises a user interface for the purpose of selecting the information relating to the member that is to be visualized.
- the information relating to the member is a state of said member.
- the visualization screen is visible from outside the jet engine.
- the visualization screen comprises a visualization surface that is generally perpendicular to the axis of rotation of the jet engine and/or that is generally vertical.
- the cowling comprises an exterior surface which is flush with the exterior surface of the screen.
- the member is a consumable and/or replaceable element of the jet engine.
- the member comprises an RFID chip that is able to communicate with the screen.
- the visualization screen comprises a dedicated electrical supply and/or a dedicated computer memory.
- the visualization screen is arranged in the lower half of the jet engine.
- the jet engine comprises multiple members, each one with multiple sensors, optionally the visualization screen is configured for visualizing the information from each one of said members.
- the screen displays the information from said members directly or via the monitoring system.

The monitoring system is not an essential aspect of the present application. The present application also relates to a jet engine comprising an external cowling, a member with an information item such as a state or a data point of the member; noteworthy in that the external cowling comprises a visualization screen that is connected to the member so as to display its information.

The present application also relates to a method for inspecting a member of an aircraft jet engine, noteworthy in that the jet engine conforms to the present application, the method comprising a step (a) of operation of the jet engine, and a step (c) of visualization, on the ground, of the visualization screen in order to inspect the information relating to the member.

According to advantageous embodiments of the present application, the method may comprise one or more of the following features, taken alone or in any possible technical combination:

- during the step (a) of operation, the aircraft is in flight, and/or during the step (c) of visualization, the jet engine is shut down.
- the aircraft comprises at least one supply of energy to the jet engine, which is shut off during the step (c) of visualization.
- the aircraft comprises a cockpit and a computer digital controller which forms a data link between the jet engine and the cockpit.
- the aircraft comprises a maintenance assistance system in which is integrated the monitoring system of the member.
- the aircraft comprises multiple jet engines according to the present application, wherein each jet engine communicates with the maintenance assistance system and/or with the digital controller during the step (a) of operation; said communication being interrupted during the step (c) of visualization.
- in the step (c) of visualization, the visualization screen is configured to display at least one of the parameters included in the following group: the time since last maintenance of the member, the time since last replacement of said member, the time remaining until next maintenance of the member.
- the method comprises a step (b) of waiting between the step (a) of operation and the step (c) of visualization, wherein said waiting step (b) lasts at least: 1 min, or 5 min, or 30 min.
- the aircraft comprises multiple jet engines according to the present application.

The present application also relates to a computer program comprising code instructions for implementing the method for inspecting a member of an aircraft jet engine according to the present application, when it is carried out by processing means.

In general, the advantageous embodiments of each subject of the present application are also applicable to the other subjects of the present application. Each subject of the present application can be combined with other subjects, and the subjects of the present application can also be combined with the embodiments of the description which, moreover, can be combined with one another according to all technically possible combinations.

The present application makes it possible to simplify maintenance, and in particular the acquisition of data necessary for this function. This procedure remains simple even when the jet engine is shut down, and/or its FADEC is otherwise engaged, in particular when communicating its flight data to another computer system. In particular, the acquisition of data during an inspection on the ground no longer requires the FADEC. This limits the functions that the latter must perform and preserves its level of security.

One benefit of the present application is that it becomes possible to collect data relating to a member even when the member is removed from the jet engine. Indeed, the memory of the visualization screen has relevant data in spite of the absence of the member in question. This simplifies the flow of information and the reliability thereof during ground maintenance. The risks connected to the fact that multiple maintenance teams are acting simultaneously are reduced.

The present application makes it possible to select from the sensors currently in use, for example on a reservoir, and to keep only those which are truly indispensable in addition to being secure. Thus, the transparent inspection window currently fitted to a reservoir becomes optional. Indeed, the electronic fill level sensor makes it possible to guarantee reliable information without reducing the robustness of the reservoir.

In the following description, the terms "internal" and "external" refer to a position relative to the axis of rotation of an axial-flow turbomachine. The axial direction corresponds to the direction along the axis of rotation of the turbomachine. The radial direction is perpendicular to the axis of rotation. Upstream and downstream refer to the principal flow direction of the flow in the turbomachine.

FIG. 1 shows, in a simplified manner, an axial-flow turbomachine in section along its axis of rotation. This specific case is that of a turbofan engine. The jet engine 2 comprises a first compression stage referred to as the low-pressure compressor 4, a second compression stage referred to as the high-pressure compressor 6, a combustion chamber 8 and one or more turbine stages 10. In operation, the mechanical power of the turbine 10, transmitted via the central shaft to the rotor 12, moves the two compressors 4 and 6. The latter comprise multiple rows of rotor blades associated with rows of stator vanes. The rotation of the rotor about its axis of rotation 14 thus makes it possible to generate a flow of air and to progressively compress the latter up to the inlet to the combustion chamber 8.

An intake fan 16 is coupled to the rotor 12 and generates a flow of air which is split into a core flow 18, passing through the various above-mentioned stages of the turbomachine, and a bypass flow 20, passing through an annular duct (shown in part) along the machine so as to then re-join the core flow at the turbine outlet. The fan 16 may be of the un-ducted type, for example with double, contra-rotating rotors, possibly positioned downstream.

Reduction means 22, such as an epicyclic gearset, can reduce the rotational speed of the fan and/or of the low-pressure compressor 4 compared to the associated turbine. The bypass flow 20 can be accelerated so as to generate a thrust reaction. The core flow 18 and bypass flow 20 are coaxial annular flows, one inside the other. They are ducted by the casing of the turbomachine and/or the shrouds. To that end, the casing has cylindrical walls which can be internal and external.

Furthermore, the jet engine 2 may have a nacelle 24 surrounding the fan 16. The nacelle 24 may surround the entire engine. It may surround the compressors (4; 6), possibly the turbine 10 and the combustion chamber. It forms the external envelope. It forms a fairing and is provided with an aerodynamic profile. It may be bounded by an external cowling 26. The external cowling 26 may form the external surface thereof and hide the interior of the jet engine 2. It may form part of the casing.

Figure 2:
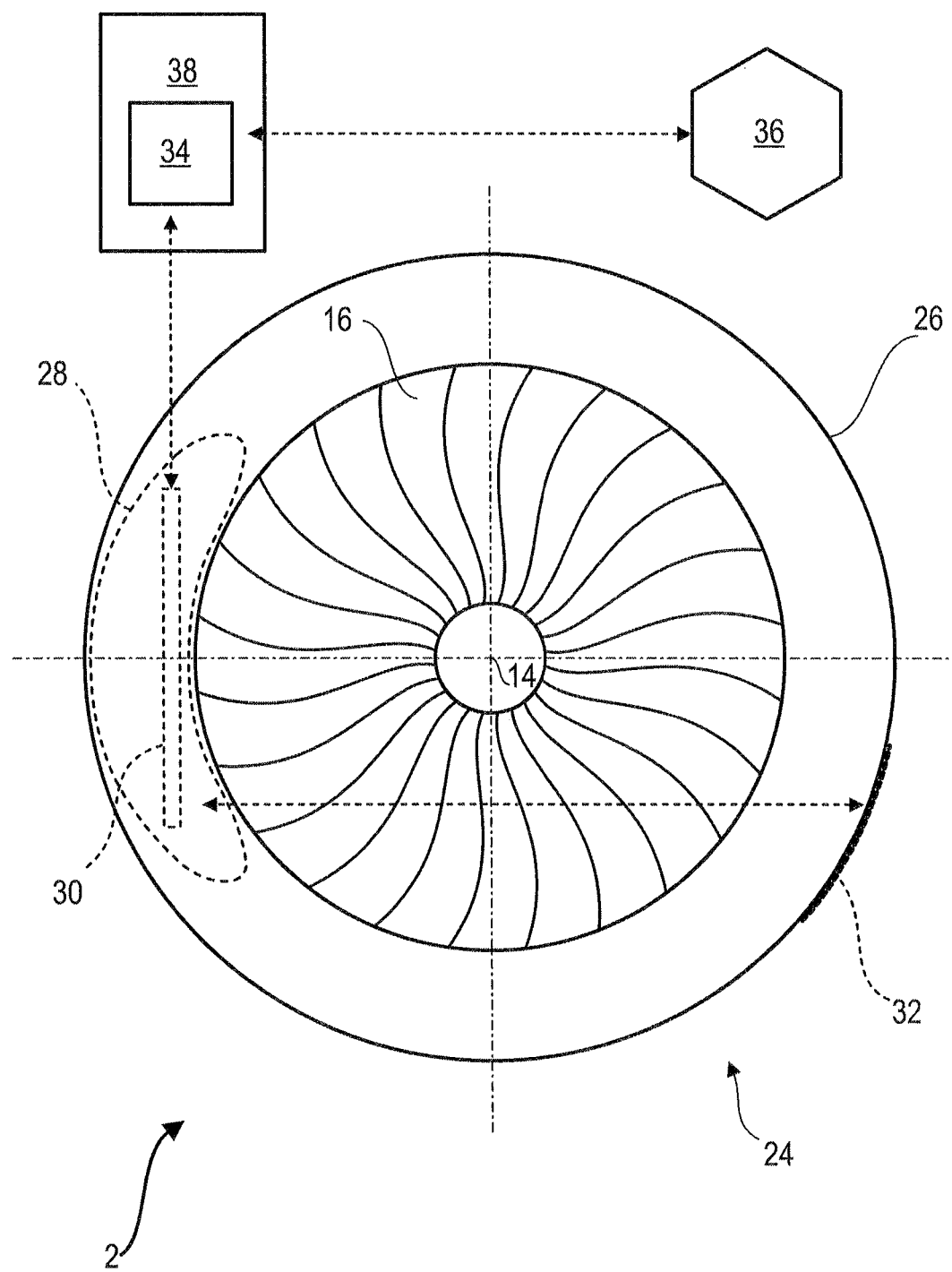
FIG. 2 is a front view of the jet engine of FIG. 1.

FIG. 2 is a front view of the jet engine 2, as seen from upstream. The figure shows the fan 16 and the axis of rotation 14. The nacelle 24 is seen from the front.

The jet engine 2 comprises various members, also referred to as the ancillaries. By way of example, it may comprise an oil reservoir 28, actuators, pumps, a starter, a heat exchanger. The reservoir could be an auxiliary fuel reservoir.

The fill level of the reservoir 28 can be estimated by means of a sensor such as a probe 30. This probe can sit in the oil contained in the reservoir 28 and can provide information regarding the fill level via an electric variable such as an electric resistance and/or a voltage. The probe 30 can also measure changes in the composition of the oil, and/or measure the presence of metallic debris, in particular ferromagnetic debris.

The jet engine 2 advantageously comprises a visualization screen 32. The visualization screen 32 can for example be mounted on the cowling 26. It can be accommodated in a window created in the wall of the cowling 26. Thus, it is supported by the cowling 26 while being visible from the outside, that is to say from the surroundings of the jet engine 2. The visualization screen 32 can be movable. This can be achieved via the intermediary of the cowling 26 when the latter is able to pivot. The visualization screen 32 can be a liquid-crystal display (or LCD) screen. Alternatively, the visualization screen 32 may be an LED (light-emitting diode) screen or an OLED screen, so as to be able to adopt a curved shape. Any other type of screen which can display variable content is conceivable.

The visualization screen 32 is configured to provide the state of at least one member of the jet engine 2, or of several members simultaneously. For example, it is able to indicate the fill level of the reservoir 28, in particular using the probe 30. Thus, it becomes possible to know the liquid level without opening the jet engine 2. Furthermore, this same level can be known to a technician without the reservoir having a transparent window through which the level can be observed, and without the engine running since the visualization screen 32 can include an independent electrical supply, and possibly a computer storage memory associated with a computer processor.

Since the visualization screen 32 can be shared between multiple members of the jet engine, it is possible to provide a user interface in order for a user to enter data such as choices. For example, the user can select those data which are of interest. Among others, the user can choose to consult records of temperatures, pressures, vibrations, mechanical forces which are continuously recorded. A computer program with code instructions accompanies the user and allows the visualization screen 32 to carry out its various functions.

The jet engine 2 can also comprise a monitoring system 34. The communication between the visualization screen 32 and the member may be direct or via the monitoring system 34. The member, and possibly its one or more sensor(s), may comprise a radio transmitter with a memory. For example, it may be an RFID (radio-frequency identification) chip. Such an element uses waves to communicate with a receiver secured to the visualization screen 32 and/or the monitoring system 34.

The aircraft on which the jet engine 2 is mounted can comprise multiple jet engines 2, for example mounted below its wings. It may also comprise a computer digital controller 36, usually referred to as a FADEC (or "full authority digital engine control"). The latter serves to monitor the mechanical and electronic operation of the jet engine 2.

The aircraft can also be fitted with a maintenance assistance system 38. This latter system can receive the system 34 for monitoring the member, and/or have common parts. The maintenance assistance system 38 is usually referred to as the ACMS (or "aircraft condition monitoring system").

Figure 3:
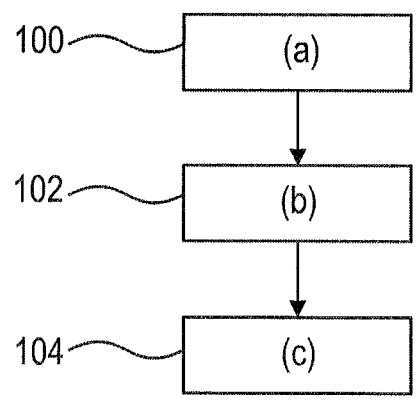
FIG. 3 shows a diagram of the method for inspecting a member of an aircraft jet engine according to the present application.

FIG. 3 is a diagram of the method for inspecting a member of an aircraft jet engine. The jet engine may correspond to that described by FIGS. 1 and 2.

The method may comprise the following steps, carried out in the following order:
(a) operation 100 of the jet engine; then
(b) waiting 102; and
(c) visualization 104, on the ground, of the visualization screen by a ground technician in order to inspect the state of the member or of each member shown on the screen.

During the step (a) of operation 100, the aircraft is in flight, that is to say aloft. It can also move on the ground. The jet engine heats up. The aircraft comprises a cockpit that communicates with the computer digital controller, which allows the pilots to follow the state of the aircraft, in particular independently of the visualization screen.

The associated aircraft can comprise multiple jet engines as described above. Each jet engine communicates with the maintenance assistance system and/or with the digital controller during the step (a) of operation 100. However, this communication can be interrupted during the step (c) of visualization 104, while allowing visualization of the state of the members with the screen since the screen is autonomous and can interact with each one of the members.

The step (b) of waiting 102 can form a separation delay between the end of the step (a) of operation 100 and the start of the step (c) of visualization 104. During the step (b) of waiting 102, the jet engine is in a resting state, which can continue during the step (c) of visualization 104. During the step (b) of waiting 102, the jet engine cools down. It can expand owing to the ambient temperature. It can change shape and configuration.

The step (b) of waiting 102 is a moment in which the jet engine stabilizes. The oil contained in the jet engine can flow under gravity back to a lower part of the jet engine. It is less dispersed and can return to the reservoir. Thus, the information provided on the ground by the probes and/or sensors of the reservoir is more reliable, in particular with respect to the overall quantity of oil.

The step (b) of waiting 102 can separate the steps (a) of operation 100 and (c) of visualization 104, by at least: 1 min, or 15 min, or 1 h 30 min.

During the step (c) of visualization 104, the jet engine is shut down, and in particular the rotation of its rotor is stopped. It no longer generates thrust. The energy that the aircraft supplies to the jet engine, for example electricity and/or fuel, is interrupted. The jet engine becomes autonomous in terms of energy, in particular with respect to the aircraft. From that point, the operation of the visualization screen can rely on its own power supply, for example a battery.

In the step (c) of visualization, the visualization screen is configured to display at least one of the parameters included in the following group: the time since last maintenance of the member, the time since last replacement of said member, the time remaining until next maintenance of the member. A technician can then compare these times and check whether they still agree with the states and records of the members in question.

I claim:
1. A jet engine, comprising:
   a member;
   a monitoring system for the member that is able to provide information relating to the member; and
   an external cowling comprising:

a visualization screen that is able to communicate with the monitoring system or directly with the member, so as to display the information relating to said member.

2. The jet engine according to claim 1, wherein the external cowling further comprises:
a wall with a recess in which the visualization screen is arranged.

3. The jet engine according to claim 1, wherein the external cowling can be moved so as to articulate the visualization screen with respect to the member, the visualization screen being separate and distinct from the member, and the visualization screen being contactless and distant from the member.

4. The jet engine according to claim 1, further comprising:
a nacelle, the external cowling forming at least partially the nacelle.

5. The jet engine according to claim 1, wherein the member comprises:
a sensor that is able to measure data which is displayed on the visualization screen.

6. The jet engine according to claim 5, wherein the sensor is a level sensor, or a temperature sensor, or a pressure sensor, the output of which is displayed on the visualization screen.

7. The jet engine according to claim 1, further comprising:
an electrical supply and a computer memory.

8. The jet engine according to claim 1, wherein the member comprises:L
a radio transmitter configured to communicate with the visualization screen in order to communicate the information relating to the member.

9. The jet engine according to claim 1, wherein the member is an oil reservoir having a fully opaque outer surface.

10. The jet engine according to claim 1, wherein the visualization screen comprises:
a unit for processing data of the information relating to the member.

11. The jet engine according to claim 1, further comprising:
a user interface for the purpose of selecting the information relating to the member that is to be visualized.

12. A method for inspecting a member of a jet engine for an aircraft, the jet engine comprising an external cowling, a member, a monitoring system for the member that is able to provide information relating to the member, and a visualization screen which is mounted on the external cowling, and which is structurally and functionally adapted for communicating with the monitoring system or directly with the member, so as to display the information relating to said member, the method comprising:
a step of operation of the jet engine; and
a step of visualization, on the ground, of the visualization screen by an operator, in order to inspect the information relating to the member.

13. The method according to claim 12, wherein during the step of operation, the aircraft is in flight, and during the step of visualization, the jet engine is shut down.

14. The method according to claim 12, wherein the aircraft comprises a power supply for the jet engine, the power supply being shut off during the step of visualization.

15. The method according to claim 12, wherein the aircraft comprises a cockpit and a computer digital controller which forms a data link between the jet engine and the cockpit.

16. The method according to claim 12, wherein the aircraft comprises a maintenance assistance system in which is integrated the monitoring system of the member.

17. The method according to claim 15, wherein the jet engine is a first jet engine of the aircraft, the aircraft further comprising a second jet engine which includes a second external cowling with a second visualization screen, and a second member; the second visualization screen being structurally and functionally adapted for communicating with the monitoring system or directly with the second member so as to display a second information relating to said second member, wherein the first jet engine and the second jet engine communicate with the maintenance assistance system and with the digital controller during the step of operation; said communication being interrupted during the step of visualization.

18. The method according to claim 12, wherein during the step of visualization, the visualization screen displays at least one of the parameters included in a group consisting in: a time since last maintenance of the member, a time since last replacement of said member, a time remaining until next maintenance of the member.

19. The method according to claim 12, further comprising:
a step of waiting between the step of operation and the step of visualization, wherein said waiting step lasts at least 5 minutes.

20. A non-transitory computer readable medium storing computer program instructions for implementing a method for inspecting a member of an aircraft jet engine, when such program instructions are executed by processing means, the jet engine comprising:
an external cowling,
a member surrounded by the external cowling,
a monitoring system for the member that is able to provide information relating to the member; and
a visualization screen which is fixed to the external cowling on an inner surface thereof, and which is structurally and functionally adapted for communicating with the monitoring system and/or directly with the member, so as to display the information relating to said member;
wherein the method comprises:
a step of operation of the jet engine, and
a step of visualization, on the ground, of the visualization screen in order to inspect the information relating to the member.

* * * * *